US012344511B2

(12) United States Patent
Säkkinen et al.

(10) Patent No.: US 12,344,511 B2
(45) Date of Patent: Jul. 1, 2025

(54) LIFTING APPARATUS OF CRANE AND METHOD OF OPERATION THEREOF

(71) Applicant: KONECRANES GLOBAL CORPORATION, Hyvinkää (FI)

(72) Inventors: Simo Säkkinen, Hyvinkää (FI); Juhani Lukkari, Hyvinkää (FI); Lukas Pieper, Bochum (DE); Kai Hartmann, Gevelsberg (DE)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 218 days.

(21) Appl. No.: 17/996,965

(22) PCT Filed: Apr. 29, 2021

(86) PCT No.: PCT/FI2021/050321
§ 371 (c)(1),
(2) Date: Oct. 24, 2022

(87) PCT Pub. No.: WO2021/219942
PCT Pub. Date: Nov. 4, 2021

(65) Prior Publication Data

US 2023/0072458 A1 Mar. 9, 2023

(30) Foreign Application Priority Data

Apr. 29, 2020 (FI) ..................................... 20205438

(51) Int. Cl.
*B66D 1/12* (2006.01)
*B66C 13/22* (2006.01)
(Continued)

(52) U.S. Cl.
CPC ................ *B66D 1/12* (2013.01); *B66C 13/22* (2013.01); *B66D 1/22* (2013.01); *B66D 1/485* (2013.01)

(58) Field of Classification Search
CPC ............... B66D 1/14; B66D 1/16; B66D 1/22
See application file for complete search history.

(56) References Cited

U.S. PATENT DOCUMENTS 4,698,565 A 10/1987 Behnke et al.
2008/0308360 A1 * 12/2008 Weinberger .............. B66D 5/08 187/250

(Continued)

FOREIGN PATENT DOCUMENTS

CN 204224155 U 3/2015
DE 3710132 C2 * 6/1999 ............... B66D 1/22

(Continued)

OTHER PUBLICATIONS

Extended European Search Report for European Application No. 21795940.2, dated May 2, 2024.

(Continued)

*Primary Examiner* — Anna M Momper
*Assistant Examiner* — Nathaniel L Adams
(74) *Attorney, Agent, or Firm* — Birch, Stewart, Kolasch & Birch, LLP

(57) ABSTRACT

A hoisting mechanism of a crane comprising at least one rope drum for a hoist rope, at least one hoist motor for driving the rope drum, a gearing coupled between the rope drum and the hoist motor, and having an input gear on the hoist motor side and an output gear on the rope drum side, and a brake for braking the input gear. The gearing has a differential to which a first input gear and a second input gear are arranged, wherein the first input gear and the second input gear are coupled to each other and further coupled to the output gear, wherein a first hoist motor connected to the first input gear, and a second hoist motor connected to the second input gear are arranged, and wherein the first input gear and the second input gear have unequal total gear ratios (Continued)

relative to an output shaft. The invention also relates to a method for operating this hoisting mechanism.

15 Claims, 5 Drawing Sheets

(51) Int. Cl.
*B66D 1/22* (2006.01)
*B66D 1/48* (2006.01)

(56) References Cited

U.S. PATENT DOCUMENTS

| | | | | |
|---|---|---|---|---|
| 2011/0174540 | A1 | 7/2011 | Ferrari | |
| 2012/0302387 | A1 | 11/2012 | Scekic et al. | |
| 2014/0284108 | A1 | 9/2014 | Pendleton et al. | |
| 2015/0083985 | A1 * | 3/2015 | Lervik | B66D 1/22 254/340 |
| 2017/0305729 | A1 | 10/2017 | Lautwein et al. | |
| 2018/0251353 | A1 | 9/2018 | Netecke et al. | |

FOREIGN PATENT DOCUMENTS

| | | | |
|---|---|---|---|
| EP | 0919512 | A2 * | 6/1999 |
| GB | 876647 | A | 9/1961 |
| JP | 2-97391 | U | 8/1990 |
| JP | H04235898 | A | 8/1992 |
| JP | 11-180687 | A | 7/1999 |
| JP | 2006096500 | A | 4/2006 |
| SU | 92722 | A1 | 11/1950 |
| WO | 2009098239 | A1 | 8/2009 |

OTHER PUBLICATIONS

Japanese Office Action for Japanese Application No. 2022-565986, dated Dec. 5, 2023, with an English translation.

Chinese Office Action and Search Report for Chinese Application No. 202180031356.X, dated Feb. 27, 2025, with English translation.

* cited by examiner

LIFTING APPARATUS OF CRANE AND METHOD OF OPERATION THEREOF

BACKGROUND OF THE INVENTION

The invention relates to a hoisting mechanism of a crane according to the preamble of claim 1, and to a method according to the preamble of claim 12 for operating this hoisting mechanism.

Today, in industrial machinery, generally an alternating current operated squirrel cage motor and a gearing are used to generate working motion, which is utilized in different machines in different ways as needed.

Cranes typically use an alternating current operated squirrel cage motor and a gearing coupled to the wheels of the crane to generate movement to the wheels for moving the crane. The same principle is used also for driving other machine parts.

The hoisting mechanism typically includes at least one electric motor, at least one brake, at least one hoist rope, at least one rope drum for the hoist rope, and a hoist member for hoisting the load. The hoist rope pulled with the rope drum is guided from the rope drum through the pulley arrangement of the hoist member to the fixed attachment point of the crane. The pulley arrangement comprises pulleys at the top of the hoist car and in the hoist member. The number of the pulleys is determined by the strength of the rope and the load to be hoisted.

The design process of the mechanism involves knowledge of many different areas and coordination thereof, and where all areas affect the other areas.

Figure 3:
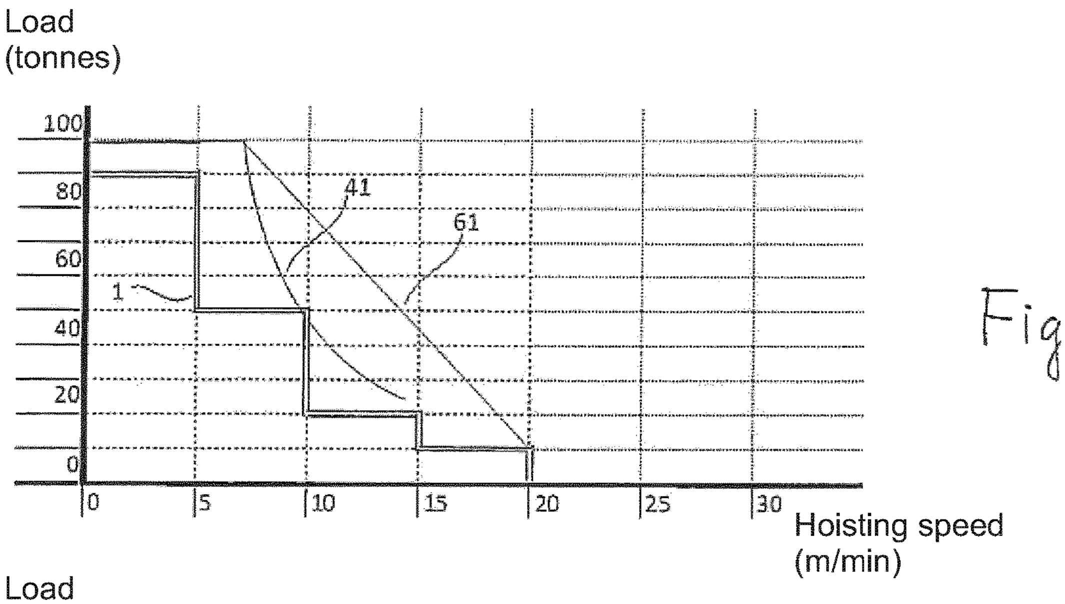

In the following the main process of designing a mechanism is briefly described. The designer of the mechanism assembles the different sub-areas into technical documents, with which the components can be individually matched. The number, size, strength, and type of hoist ropes are initially selected. Next, the size, location, model, and position relative to the rope line are selected for the pulleys and the hook. At this stage, the rope system as a whole is checked to ensure that the above-mentioned sub-areas are compatible with each other so that they form a functional entirety, and that the rope system is able to withstand the necessary loads and that the speeds of the rope system and pulleys remain within the allowable range. If necessary, the configuration is altered to achieve the target values. Next, the designer of the mechanism designs or selects a hoist drum whose details, location, rope grooves, etc. are designed so that the hoist drum is compatible with all other sub-areas. Once the rope drum has been selected, it is proceeded to the mechanism that rotates the drum, which includes various devices such as a hoist gear, hoist brakes, a hoist motor, and the clutches and mounting platform required to match them. The designer of the mechanism makes the selections and calculations for all of the above-mentioned components so that the required loads and speeds remain within the allowed range. If necessary, the configuration is altered to achieve the target values. The selection of the power and gear is performed together with the motor selection in order to find the most advantageous combination with which the performance values are realized. Based on the total power required, the designer of the mechanism, estimates the size of the gearing, the output gear of which corresponds to the speed of rotation of the drum and the input gear to the rated speed of rotation of the motor selected on the basis of power. With the selected configurations, calculations are made for different speeds and loads. Typically, the size and gears of the gearing will have to be changed, as well as the rated power of the motor and the speed of rotation or rated speed used. In the design process, the assistance of an engine designer is needed when checking the characteristics of the motors in different situations, because the voltages supplied to the motor, the required temperature, etc. greatly affect the characteristics of the motor. A gear designer is needed to figure out possible new different gear options and features. Because DC technology has been in use for a long time, its features have also determined performance values in cranes. Therefore, with the discontinuation of DC motors in general use and their replacement by squirrel cage motors, different technical implementations have had to be made in order to achieve the same performance in terms of speed and hoisting capacity as DC motors. In the attached drawings, the graphs of FIG. 3 show the differences between squirrel cage motors and DC motors.

Hoisting mechanisms are characterized by a heavy load to be handled and the high hoisting moment required by it, whereby the moment transmitted by the gearing is high, and a significantly faster hoisting and lowering speed is required when the hoisting means is hoisted without a load. This requirement is emphasized in large cranes, in terms of load hoisting ability and dimensions, having high hoisting heights. The number of pulleys, their location and the different rope arrangements make it possible to alter the rope force coming to the hoisting mechanism. When handling heavy loads, more pulleys are selected for the mechanism, through which the hoist rope is guided. In this case, the load on the hoist rope is lower. Likewise, the rotating force of the rope drum of the hoisting mechanism is smaller. Likewise, the hoisting speed achieved with the load is lower. Thus, the load to be hoisted is divided into several ropes by different rope gears, and at the same time the total gear ratio of the entire hoisting mechanism changes. By selecting the gears of the gearing as well as the hoist motor, a suitable total gear can be selected. Usually the load to be hoisted and the speed are determined by the customer.

Hoisting mechanisms are designed according to the heaviest load, which means that the hoist motors are large and have a higher achievable maximum moment and power, but a lower maximum mechanical speed of rotation.

At the maximum load to be hoisted, the hoist motor, which is typically a three-phase squirrel cage motor, the preferable speed is its rated speed of rotation. When hoisting or lowering an empty hook or a hoisting means, the maximum mechanical speed of the motor may be used the moment of the motor at that speed is at least equal to the moment required to hoist the load. In a traditional squirrel cage motor, the moment drops quickly when the motor is rotated over its rated rotation range i.e. the motor is in the so called field weakening range, where the moment roughly drops in the square of the speed of rotation, i.e. at twice the speed, the moment drops to approximately a quarter. In some situations this drop in moment is a limiting factor when determining the maximum speed for the hoisting means, for example the weight of the hoisting means or the load to be hoisted will require a moment which is higher than the moment the motor is able to generate.

The maximum mechanical continuous speed of rotation allowed for large squirrel cage motors is typically twice the rated speed of rotation. The squirrel cage motor has replaced DC motors generally due to its low maintenance requirements and lower overall costs, but its ability to generate power and moment at speeds of rotation higher than the rated speed of rotation, in the so called field weakening range, is weaker and causes new challenges in designing hoist mechanisms. As illustrated before, the operating range of a squirrel cage motor, depending on the model of the motor, is from 0 to approximately 2.5 times the speed, with larger motors to approximately twice the rated speed of rotation, but despite of the high maximum moment, the moment drops quickly after the rated speed of rotation. The moment reached with DC motors with speeds of rotation greater than the rated speed of rotation decreases linearly which means that with different speeds in the field weakening range, constant power can be achieved, whereas the moment reached with squirrel cage motors decreases after the rated speed of rotation in square of the ratio between the used speed of rotation and the rated speed of rotation, in which case the reachable hoisting power decreases faster than with the DC motor, causing the maximum power of the crane not to be reached with light loads. FIG. 3 of the drawings, which is later described in more detail, illustrates graphically this difference between graphs 41 and 61. When it is desired to hoist or lower an empty hoisting means, for example, four time the speed, a speed range selector, separate or in connection with the actual gearing, may be used.

The speed range selector is a speed changing gearing, that has one input shaft driven by an electric motor, and an output shaft driving a rope drum, wherein a gear can be selected between the input and the output shafts. Usually, the speed changing gearing has two different gears with a mutual ratio of two. When changing the gear ratio of the speed changing gearing, the mechanism cannot be used and the brakes holding the hoist drum still are coupled shut, because in intermediate positions there is no mechanical coupling between the input and the output shafts. In a traditional hoisting mechanism, the motor is designed to be larger or multiple motors are used. This works up to a certain limit, but when the load or speed differences increase enough, this solution is not practical. The differential has been used mainly in critical solutions, where redundant reliability has been sought. For improving performance, this solution has not been an option, as this solution uses two equal motors to drive both input shafts having equal input gears relative to the output shaft, making it a preferable alternative is to use a traditional gearbox and a motor with twice the power. So, it has been easy to arrive to the speed changing gearing, which has been used for decades.

By using a speed changing gearing, the requirement of the example is reached, when the empty hoisting means can be hoisted or lowered according to the maximum mechanical speed at four times the speed with the fast gear of the speed changing gearing, and heavy load can be hoisted slowly with the slow gear. The selection of the speed and load range of the speed changing gearing is done manually, i.e. the crane operator selects the load range to be used.

The problem with the above is changing the gear of the gearing, which cannot be done while the mechanism is running, but the hoisting mechanism must always be stopped when the change of speed range is performed. Likewise, reliable coupling is problematic as the cogwheels do not rotate and coupling is not always successful. In this case, the gear remains on so called intermediate gap, in which case powerline has a breakage, that needs to be fixed by switching to local control and, if necessary, aiding the coupling of the gearing by hand, which causes long interruptions in the use of the device.

At worst, the above described situation can cause, based on a signal from a sensor measuring the coupling of an incorrect gear, a situation where the state of the gear is not detected correctly and the mechanism is started (and the brakes are released), causing the load to fall.

The gear control technology requires sensors and actuators, the failure of which prevents use of the mechanism and therefore use of the crane.

The speed changing gearing is also a separate component and requires coupling devices on both sides and its installation is done between the actual main gearing and the motor, i.e. relatively great amount of space is needed in a small engine room. Additionally, maintenance of the actuators requires special expertise when they are positioned in the above described manner in an operation wise critical destination.

The space between the gear steps in the middle position of the speed changing gearing of the gear in question is dangerous, because if this state is not detected, the power line is "open" and the weight caused by the hoisting means or the load, causes the load to fall. Additionally, the maximum moment of the squirrel cage motor decreases rapidly when the motor is used at a speed higher than the rated speed of rotation and this limits the speed of movement of the hoisting means.

CN 204224155 U discloses a solution having two different gears, two different input shafts arranged having different gears relative to the output shaft, and electric motors are arranged on both input shafts. In this solution, only one motor and input shaft are driven at a time. The selection of the motor and the input shaft is coupled with a signal guided friction clutch to the output shaft, whereby the power is transferred from the input shaft in question to the output shaft. The functioning principle is similar for both input shafts and only one input shaft can be connected with the clutch to the output shaft, so only the power of the motor coupled to the input shaft in question is available to the output shaft. So, only the other motor can generate power to the output shaft. Such a friction clutch does not have coupling problems, like the toothed clutch of the speed changing gearing of a crane, but in crane applications this type of friction clutch cannot be used as it cannot transmit moment reliably unlike the toothed clutch of the speed changing gearing.

Another way to reach four times the speed with an empty hoisting means is to select the gear of the main gearing so that the desired hoisting speed at a full load is achieved at the speed of the hoist motor, and is, for example 50% of its rated speed of rotation. In this case, the speed can be increased to four times before the maximum mechanical speed of rotation is reached. The problem with this solution is that the same power is required from the motor at a speed of 50% so that the hoisting means and the load can continue to move at the same speed. In this case, the motor has to be selected to be greater in rated value or to drive two or more motors on the same shaft in succession, and to select also the control devices of the motor and the cables to be correspondingly greater, increasing investment costs and space requirements.

A traditional differential, having same gears between the input shafts relative to the output shaft, and having motors with equal properties arranged on the input shafts, does not provide an improvement in the problem described, as the achievable load hoisting capacity in terms of speed is similar to a traditional gearing solution, having two above-mentioned motors coupled in series and an appropriate gear selected for the gearing.

As previously shown, the operating range of the squirrel cage motor is from 0 speed to approximately 2.5 times the rated speed of rotation, but despite the great maximum moment, the moment decreases rapidly after the rated speed of rotation.

If the input shafts of the differential have the same gears and the same motors, the drop of the driven moment on the output shaft has a similar shape, because the moments obtained from the input shafts are equal, i.e. parallel/overlapping.

SUMMARY OF THE INVENTION

The object of the present invention is to solve the above described problems and, in addition, to introduce new and improved features to the use of the hoisting mechanism. This object is achieved with a hoisting mechanism according to the invention, which is characterized by what is claimed in the characterizing part of claim 1, and with a method according to the invention, characterized by what is claimed in the characterizing part of claim 12.

Thus, in the present invention, the above described gearings according to prior art are replaced with a differential having two input gears having different gear ratios to the output gear. Multiple advantages are achieved with the invention. In designing hoist motor drives, oversizing can be avoided, including peripheral devices thereof and space utilization. The hoisting speed of a light load or an empty hoist member is greater, which is a considerable improvement. When changing the hoisting speeds, the usual coupling issue can be avoided and the load is prevented from falling, as while changing, at least the moment of one hoist motor is always coupled. The change of hoisting speeds is smooth and reliable, causing time savings. The change of hoisting speeds can be done automatically.

In a differential, the speeds of rotation of the input gears are added to the output shaft, i.e. if only the first input shaft is rotating at speed a and the second input shaft is stationary, the speed of rotation of the output shaft is b. When, in addition to the first input shaft mentioned above, the second input shaft is also rotating at speed a, if both input gears have same gear ratio relative to the output shaft, the speed of rotation of the output shaft can be expressed as a product 2*b or as a sum b+b.

In this application, first and second input gears broadly refer to all such combinations of transmission that can be combined between the first and second driving motors and the gear ratios of the output shaft of the differential including the gear between the first and second input shafts of the differential and the output shaft of the same differential, possibly also a first pre-gear added to the first or second input shaft of the differential.

Also, changes in different embodiments of the motor driving the input shaft, such as for the motors coupled to the first and the second input shafts, different electrical coupling modes, different rated speeds of rotation, different number of hubs, number of motors, or other embodiments affecting the speed of rotation or torque of the input shafts of the differential, which can have a different effect between the first and second input shafts.

Thus, the total gear ratio of the first and second input gear relative to the output shaft can be constructed separately or in combination by the above-mentioned embodiments. Thus, it may be mentioned that the first and second input gears may have their own and separate total gear ratios relative to the output shaft.

In the definition of the total gear ratio described in the description, while the speed of the input shaft of the differential remains the same, increasing the total gear ratio results in increase of moment of the output shaft and in decrease of speed, and decreasing the total gear ratio results in decrease of moment of the output shaft and in increase of speed.

The differential has previously been used in cranes when the mechanism has required redundancy i.e. if the first hoist motor, brake, drive operating the hoist motor etc. fails, the failed mechanism can be stopped, be held with a brake, and the same load can be driven with a second mechanism. The input gear has however been the same for both hoist motors.

In this gearing solution according to the invention, both input gears (first and second) are timewise uninterruptedly connected to the output gear, whereby there is no coupling problem but the first and the second input gears are uninterruptedly connected to the output shaft via cogwheels of the differential.

In the present invention, when the hoisting mechanism is used with heavy loads, the first motor arranged on the first input gear is started and the second motor arranged on the second input gear is started while the first motor is still running. However, the condition for starting the second motor is that the moment received from the second motor is at least equal to the moment required to hoist the load. So, with heavy loads, only the first engine coupled to the first input shaft is driven, with the second input shaft stopped, and the second motor coupled to the second input shaft is preferably driven simultaneously with the first motor coupled to the first input shaft. The load to be hoisted is in that case typically light, whereby great hoisting speed is achieved.

A traditional differential having input shafts with equal relative gears relative to the output shaft and having motors with equal characteristics coupled to the input shafts, does not provide an improvement to the problem described. In this case, the achieved load-hoisting capacity-to-speed ratio is equal to a traditional gearing solution in which a suitable gear is selected and two of the above-mentioned motors are coupled in series to the same shaft of the input shaft or a motor with twice the power is selected.

The essence of the invention is to utilize a different total gear ratio between the first and second input shafts of the differential relative to the output shaft. Additionally, the motors arranged on the input shafts are preferably equal motors. In this case, greater speeds are reached with lower loads and the motors coupled to the first and the second input shafts are driven together or separately at different speeds according to the hoisted load information (the load is weighted with separate sensors or based on the motor currents).

When, for example, i=2 is selected as the gear of the second input shaft relative to the output shaft, which is a typical gear difference between a slow and a fast gear difference when using a separate speed changing gear, a wide speed range is achieved without mechanical coupling problem. In this case, twice the speed is achieved via the second input shaft without the problems described in the prior art presentation.

When both motors coupled to the first and second input shafts are driven in this example situation, three times the speed is achieved compared to the situation where only the first motor coupled to the first input shaft would be driven alone. In this example, the first input shaft has a higher gear, i.e. a lower achievable hoisting speed.

When the gear of the first input shaft relative to the output shaft is selected to be, for example, i=20 and the gear of the second input shaft relative to the output shaft is selected to be, for example, i=10, the ratio of the total gear ratios of the first and second input shafts is 2.

The term "ratio of total gear ratios of the first and second input shafts" is used in the descriptions to represent the relative gear ratio difference between the first and second input shafts without making statements of the total gear ratio of the gearing or the mechanism, which is formed together with the differential step of the gear and the other gears of the gearing, the rope diagram, etc.

This relative difference, two, in gear ratios between the input shafts corresponds to a typical gear ratio i=2 of the speed changing gearing and is a typical gear difference between slow and fast gear ratios when using a separate speed changing gearing.

When additionally also the same total gear ratio is selected for the differential, using the same motor as in the above described case of the speed changing gearing, with the first input shaft the same performance as the high gear of the speed changing gearing, i.e. the slow speed step, is achieved.

Correspondingly, with the second input shaft the same performance as the small gear of the speed changing gearing, i.e. the fast speed step, is achieved. This achieves a wide speed range without the problems described in the prior art presentation.

The ratio of the total gear ratios of the two input gears is preferably in the magnitude of 1.1 to 4, more preferably 1.5 to 3, most preferably 1.5-2.5 giving the best operating ranges of the hoist motors in succession with respect to the speed of the output shaft and to generate a more uniform moment over a wider speed range, thus achieving a wider usable speed range. This way, the maximum power achievable by the crane can also be achieved better with small loads, which means that the equipment is utilized most efficiently. In a differential, the speeds of rotation of the input shafts are summed. Squirrel cage motors are preferably used as motors to be coupled to the gearing.

When handling a heavy load with a hoisting mechanism according to the invention, a hoist motor, coupled to the input shaft with a greater input gear, i.e. slower hoisting speed, is used, i.e. driven. In this case, the input shaft with a smaller gear, which generates greater speed and lower load bearing ability, is stopped. When the input shaft is stopped, it is held still with brakes. So, the speed of the hoisting means is determined by the speed of the slower input shaft.

When handling a lighter load, a hoist motor, coupled to the input shaft having a greater input gear, meaning a slower hoisting speed, and additionally an input shaft having a smaller gear, meaning greater hoisting speed, is started in the first phase is used, the hoist motor started in the second phase is started and the brake is opened. When both input shafts are rotating, the speed of the hoisting means is determined based on the sum of separately reached speeds of the output shaft caused by the total gear ratios of both input shafts.

Both squirrel cage motors coupled to the input shaft of the differential, may be controlled in the same way with a common control (with a so-called direct power supply with relays, with a soft starter, with a frequency converter etc.). Best end result is however achieved when the motors are controlled separately with separate frequency converters. The squirrel cage motors may be equipped with a sensor for monitoring the rotation of the rotor shaft. The rotation of the rotor is monitored, for example, with a frequency converter to adjust the exact speed of rotation. The sensor may be a pulse sensor or an incremental sensor.

With frequency converters, the speed of both motors can be steplessly adjusted separately according to the power output of the respective motor and the moment, speed and power required by the load. In the invention, the motors are used according to the load to be hoisted. The load is weighed when hoisted, and the maximum possible speed for the motors is calculated separately according to the load information. The speed of the motors can be freely selected separately according to how much it has moment and power according to the maximum mechanical speed under different load situations. The speeds of the motors are preferably set with frequency converters. In this way, the features of both motors are fully utilized. This arrangement also makes it possible for the motors and, if desired, the components for controlling and supplying power to them, to be of the same type, so that they are interchangeable. This provides an advantage for mass production and the procurement of spare parts.

When hoisting a medium-sized load (which has a mass between the maximum and zero), the hoist motor connected to the input shaft with a greater input gear and a slower hoisting speed can be started and accelerated to the limit point which is limiting. With a light load it may be, for example, the mechanical maximum speed, or with a maximum or mid-high load it may be the maximum reachable moment in the field weakening range. If the hoisting speed needs to be further increased, a hoist motor, coupled to the input shaft with the smaller input gear and greater hoisting speed, is started and accelerated to the limiting speed with respect to the speed of rotation or moment in the so-called field weakening range. This way, the motors are utilized more efficiently and discreetly instead of stepped step-by-step control.

Since the first hoist motor drives the input shaft with the greater input gear, i.e. a slower hoisting speed, and the second hoist motor drives the input shaft with the smaller gear, i.e. a greater hoisting speed, depending on the load of the hoist member and the desired hoisting/lowering speed, the hoist motors are strived to be controlled so that the loading on both of them is substantially equal (not absolutely) and that the driving of the hoist motors is optimized, whereby the relative load of the motors is divided according to the respective load and the speed, required by the speed of rotation, so that maximum joint performance is achieved.

LIST OF FIGURES

Figure 1:
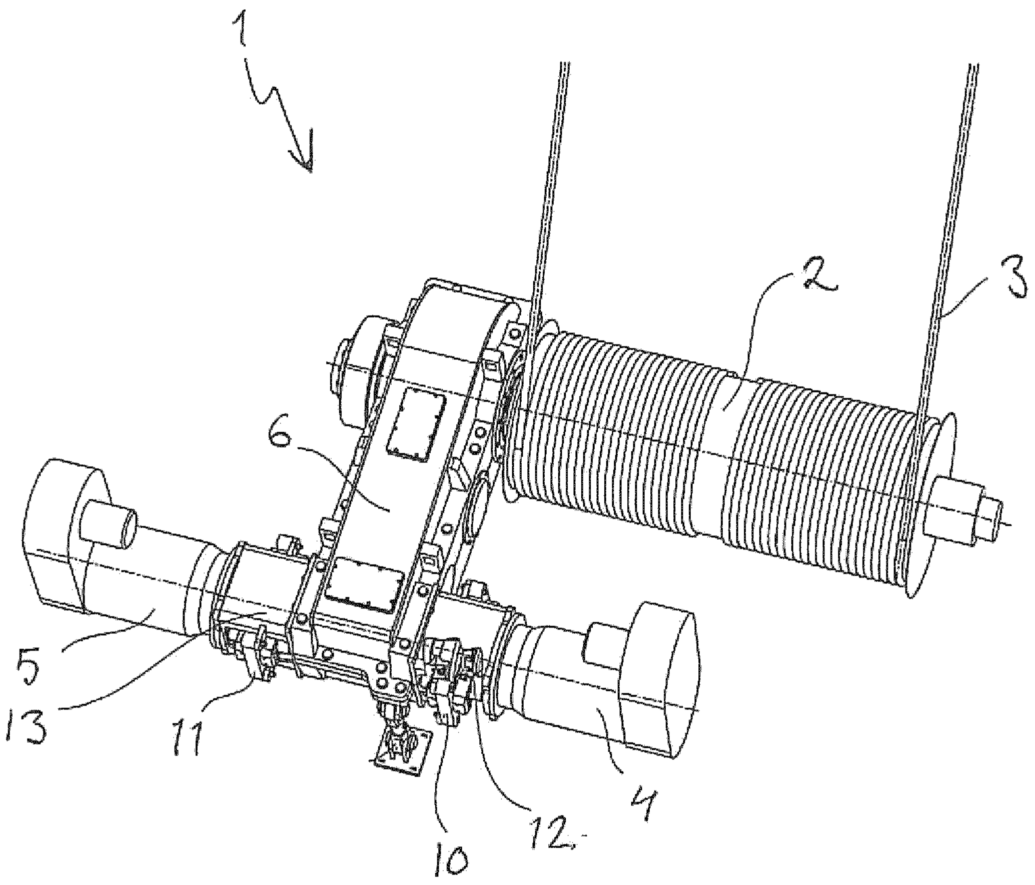
Figure 2:
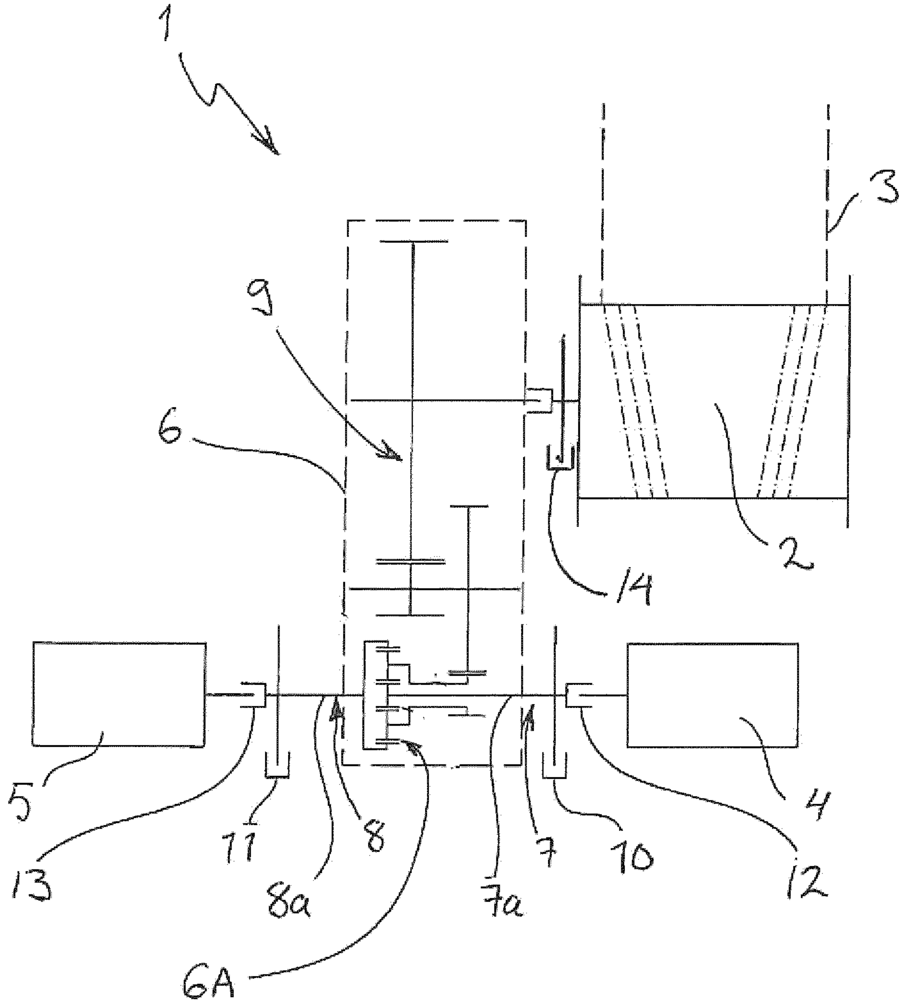
Figure 6:
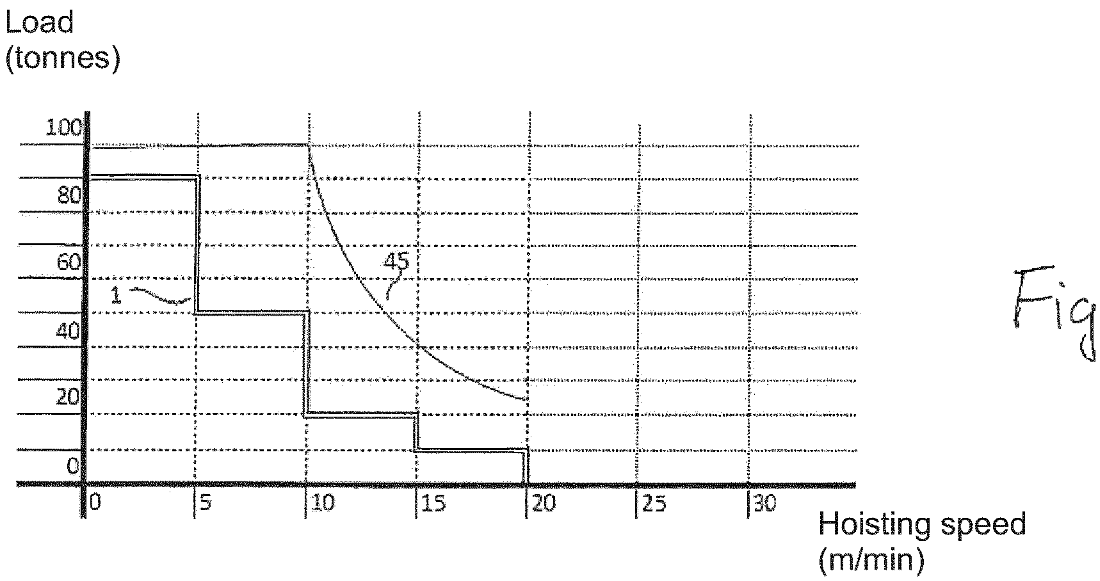
Figure 7:
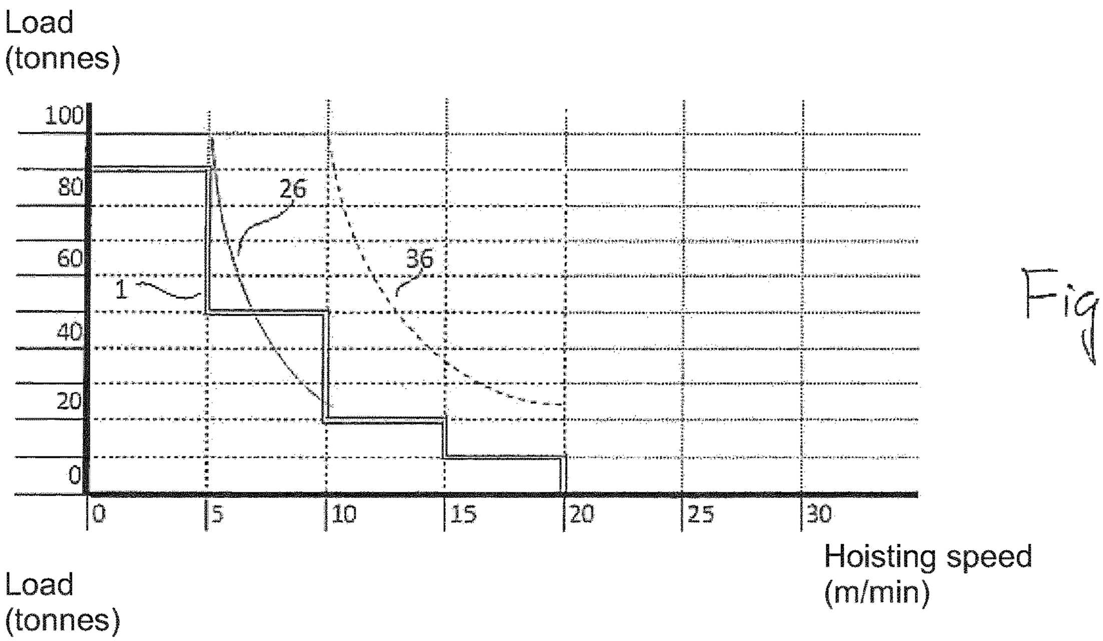
Figure 8:
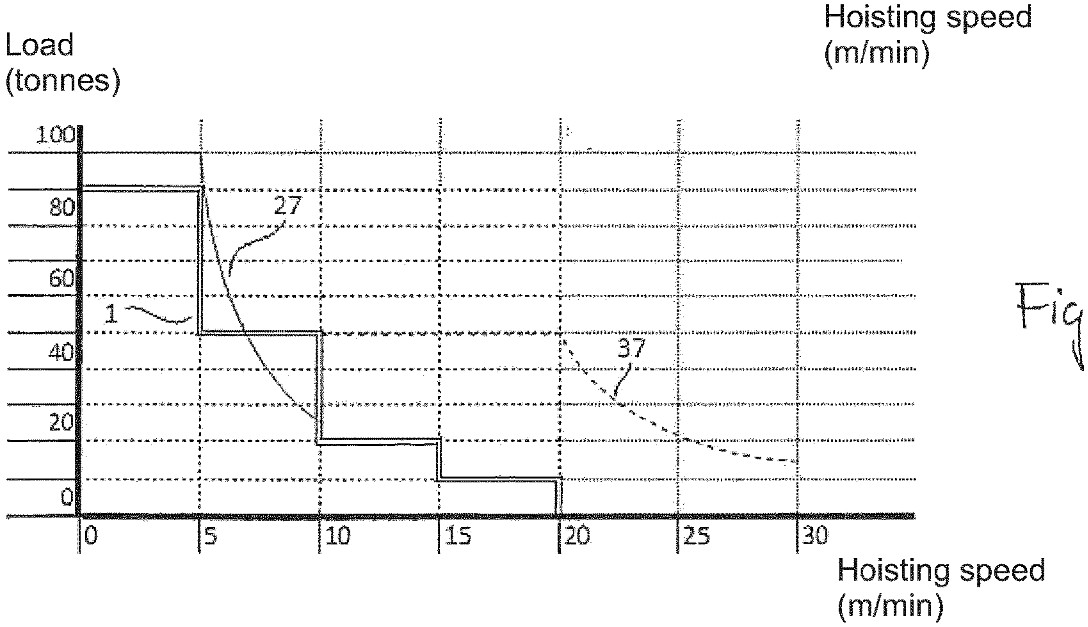
Figure 9:
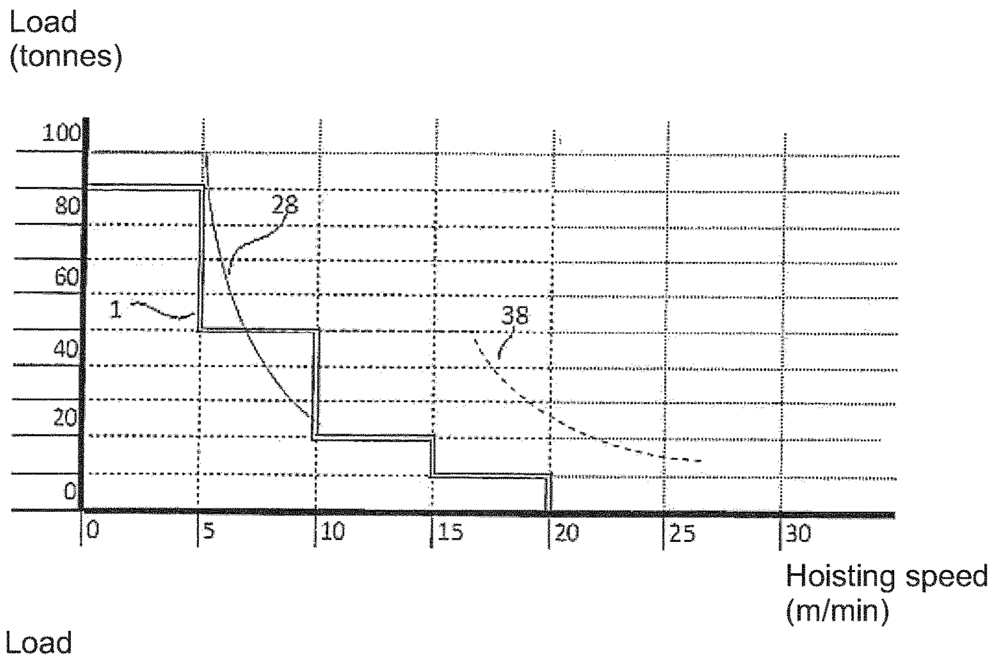
Figure 10:
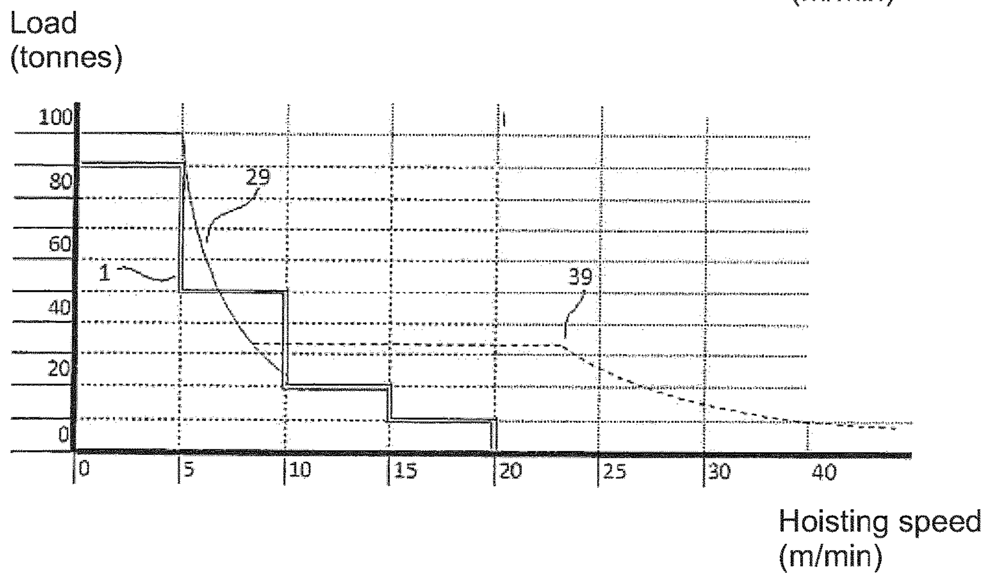

In the following the invention will be described in greater detail with reference to the attached drawings, in which FIG. 1 illustrates a perspective view of a hoisting mechanism according to the invention;

FIG. 2 illustrates a principle picture of a solution according to FIG. 1, and FIGS. 3-7 illustrate a solution according to the traditional technology as a ratio of load and hoisting speed, and FIGS. 8-10 illustrate a solution according to the invention as a ratio of load and hoisting speed.

DETAILED DESCRIPTION OF THE INVENTION

With reference to the drawings, there is shown a hoisting mechanism 1 of a crane according to the invention comprising a rope drum 2 for a hoist rope 3; two hoist motors 4,5 for driving the rope drum 2; a gearing 6 coupled between the rope drum 2 and the hoist motor 4,5, and having an input gear 7, 8 on the hoist motor 4, 5 side and an output gear 9 on the rope drum 2 side. In addition, there are brakes 10, 11 for braking the input gear 7, 8, and clutches 12, 13 for coupling the hoist motors 4, 5 to the gearing 6. The brakes 10, 11 are equipped with a sensor monitoring the open-closed state of the brake. When the brake 10, 11 is closed, it holds the input shaft 7*a*, 8*a* of the input gear 7, 8 coupled to it still. When the brake 10, 11 is open, it allows the input shaft coupled to it to rotate.

The gearing 6 has a differential 6A, the input gear 7, 8 of which comprises a first input gear 7 and a second input gear 8. The first input gear 7 and the second output gear 8 are coupled to each other and further coupled to the output gear 9.

The first hoist motor 4 can be coupled to the first input gear 7 and the second hoist motor 5 can be coupled to the second input gear 8. The first input gear 7 and the second input gear 8 are unequal relative to the output shaft. In this example, the first input gear 7 is greater than the second input gear 8. It can also be arranged so that the first input gear 7 is smaller than the second input gear 8. The difference between the total gear ratios of the first input gears 7, 8 relative to the output gear 9 can be in the magnitude of approximately 1.1-4, 1.1-3, or 1.1-2.5, depending on the desired speeds to be achieved with different loads. The greater the difference between the, the greater the theoretical speed of the hoisting means, when motors 4,5 driving both input shafts 7*a*, 8*a* are driven simultaneously, but the load bearing capacity is lower, because when driving the hoist motors 4,5 coupled to both input shafts 7*a*, 8*a* simultaneously, of these, the motor which generates smaller moment on the output shaft of the differential, is determining. The above-mentioned difference in the total gear ratio relative to the output gear 9 is a good compromise that provides virtually all advantages. The first and second input gears 7, 8 may be on the same axis line (center—to center).

The hoist motors 4,5 are preferably (frequency converter controlled) squirrel cage electric motors.

The brakes 10, 11 can be coupled with the first input shaft 7*a* and the second input shaft 8*a* and the hoist motors 4,5 can be coupled with these input shafts 7*a*, 8*a* via the above-mentioned clutches 12, 13. The shaft of the rope drum 2 preferably also has a brake 14. This, in case of an emergency if one or both of the above-mentioned brakes 10, 11 fail, ensures that the motion of the load is stopped. The brake 14 of the rope drum should be designed large enough because it is subjected to a large moment.

In the following, a few examples are presented of the mutual control of hoist motors, it is assumed that the load of the example is intended to be hoisted or lowered at maximum speed. For shortening the descriptions, the term "fast" hoist motor means a motor that drives the input shaft of the differential having a smaller total gear relative to the output shaft of the same differential, and thus a greater hoisting speed is achieved, and "slow" hoist motor means a motor that drives the input shaft having a greater total gear relative to the output shaft of the same differential, and thus a lower hoisting speed is achieved. So:

With maximum loads, the "fast" hoist motor 5 is not driven and the brake 11 of the hoist motor 5 is held closed, and only the "slow" hoist motor 4 is driven.

With medium-sized loads, both "fast" and "slow" hoist motors 4, 5 are used, whereby the speed of the "slow" hoist motor 4 is limited usually by the maximum field weakening moment, and the speed of the "fast" hoist motor 5 is limited usually by the field weakening moment already at lower speeds of rotation.

With light loads, both "fast" and "slow" hoist motors 4, 5 are used, whereby the speed of the "slow" hoist motor 4 is limited usually by the maximum mechanical speed of rotation of the hoist motor 4, and the speed of the "fast" hoist motor 5 is limited usually by the field weakening moment already at lower speeds of rotation, or then usually the maximum mechanical speed of rotation of the hoist motor 5.

Controlling the hoist motors 4,5 on the basis of the load information allows, in addition to heavy load, a wide achievable speed range steplessly, so that the capacity of both hoist motors 4, 5 is best used. The determination of the load information can be carried out with separate weighing sensors or on the basis of the measured values of the hoist motors used in the hoisting. Alternatively, the crane operator can select the load range to be utilized from the crane control system and the hoist motors 4,5 are controlled according to the predetermined speeds of the selected load range of the control system. The load information is used to determine whether the operation is performed in the operating range of the first hoist motor 4 or in the combined operating range of the first and second hoist motors 4, 5. These operating ranges can be distinguished by a load limit value.

The load limit value is determined on the basis of the load information and the moment generated by the hoist motors 4,5 coupled to the input shafts of the differential. The load limit value is the value, that at lower values than the load limit value, the first hoist motor 4 coupled to the first input shaft 7*a* and the second hoist motor 4 coupled to the second input shaft 8*a* can be simultaneously driven.

Respectively, with values equal to or greater than the load limit value, only the input shaft and the hoist motor coupled to it, generating a moment greater than the moment required for hoisting the load, are driven. In this case, the input shaft and the hoist motor coupled to it, generating a moment smaller than the moment required for hoisting the load, are held still with a brake or brakes. The load limit values may be presented graphically in FIGS. 8, 9, and 10 by means of curves 37, 38, and 39, which may present substantially the maximum value in the respective implementation. The load limit value may also be set lower in a manner selected by the supplier.

At higher values of the load limit value only the first motor 4 is used and at lower values of the load limit value the first and second motors 4, 5 are used together. Depending on the relative total gear ratios of the first and the second input shafts 7*a*, 8*a* the order of operation may also be such that only the other motor is used at the higher values of the load limit value and at the lower values of the load limit value the first and the second motor 4,5 are used together. The total gear ratio of the first input shaft 7*a*, used as an example in the descriptions, is greater than the total gear ratio of the second input shaft 8*a* and thus has a higher load hoisting capacity and a slower speed than the second input shaft 8*a*, but the opposite implementation is also possible. On the basis of the load information, the maximum speed of rotation of the simultaneously or separately running hoist motors 4, 5 connected to the input shafts 7, 8 of the differential of the same hoisting mechanism is determined.

In the event of a fault in which the motor or other component, coupled to the input shaft and driving it, is damaged or prevented from being used, only one of the hoist motors 4,5 may be used, in which case the brake 10, 11 of the input shaft 7*a*, 8*a* removed from use is closed. The factor limiting the hoisting speed may be the total power absorbed by the hoisting mechanisms. In this case, the hoisting speeds may be limited, so that the total power absorbed by the hoist motors 4,5 does not cause an overload to the system supplying power to the crane.

Comparison of the traditional technology and a solution according to the invention in light of the following example:

At a hoisting speed of 5 m/min and a load of 400 t, in the traditional technology the gearing is selected through its outgoing mechanical moment and the gears of the gearing are selected so that the squirrel cage motor is driven at its maximum power speed of rotation, for example 1200 rpm. When the maximum allowed speed of rotation of the squirrel cage motor is 2400 rpm, then the maximum speed of the hoisting means that can be achieved is 10 m/min.

If the required maximum speed of the hoisting means to be achieved is 20 m/min, with this selected hoist motor the gears of the gearing need to be changed so that the maximum allowed mechanical speed of rotation of the hoist motor corresponding to the speed of the hoisting means of 20 m/min is 2400 rpm. In this case, when hoisting a load of 400 t at a hoisting speed of 5 m/min, the speed of rotation of the hoist motor is 600 rpm (2400*5/20).

When the power required to hoist the hoisting means does not change by changing the gear of the gearing, the squirrel cage motor must generate the same power at 600 rpm, as at the speed of rotation of 1200 rpm of the first gear. This means that the motor must generate a correspondingly greater (double) moment. This double moment means that the entire power line (frequency converter, supply cables, motor) must be doubled in terms of power transmission capacity, which increases the costs of the device through multiple sections.

Comparison of the "gear changing" technology and a solution according to the invention in a hoisting situation according to the previous example:

At a hoisting speed of 5 m/min and a load of 400 t, the gearing is selected via its output mechanical moment and the gears of the gearing is selected in the speed range 1 "slow" of the gear selector so that the squirrel cage motor is driven at its maximum power speed, for example 1200 rpm. When the mechanical maximum allowed speed of rotation of the squirrel cage motor is 2400 rpm, the maximum achievable hoisting speed of the hoisting means is 10 m/min.

If the required maximum achievable speed of the hoisting means is 20 m/min, the speed 2 "fast" (gear ratio i=2) of the gear selector is used, with this selected motor, the gear of the gearing must be changed so that the maximum allowed mechanical speed of rotation of the motor corresponding with the speed of the hoisting means 20 m/min is 2400 rpm. However, the disadvantage of this solution is the need to stop the mechanism while performing the change. In addition, the change of speed ranges is not always successful reliably.

In the following the illustrations of FIGS. 3-10 are described. The motors and drive controls of the examples according to the figures are speed controlled. These figures compare the differences between a traditional solution and a solution according to the invention in terms of the ratio of load and hoisting speed:

FIG. 3:

FIG. 3 illustrates the differences between a squirrel cage motor and a DC motor having the same power, each coupled to their respective preferable gearing. The gearings have only one input shaft, but the gear ratios may differ in order to achieve a preferable assembly.

Graph 1=a graph of the required load-to-speed ratio.

Graph 61=a graph of the load-to-speed ratio generated by a linear speed/moment curve of a DC motor coupled to the input shaft of a traditional fixed gear gearing.

Graph 41=a graph of the load-to-speed ratio generated by a squirrel cage motor coupled to the input shaft of a traditional fixed gear gearing.

The gear of the gearing is selected so that at a rated speed of 1200 rpm of the motors coupled to it, the speed of the hoisting means is 7 m/min. In this case, the required rated power of the motor is 127 kW.

From the graph of the DC motor it can be seen that the required speed and hoisting capacity are achieved.

With a squirrel cage motor, the speed and the hoisting capacity do not fully meet the requirement of graph 1 with a load of approximately 50 t and a speed of 10 m/min. According to graph 1, the goal is not also reached at speeds above 15 m/min, when graph 41 ends at a speed of approximately 14 m/min.

The graphs show differences in DC motors and squirrel cage motors of the same power rating.

Figure 4:
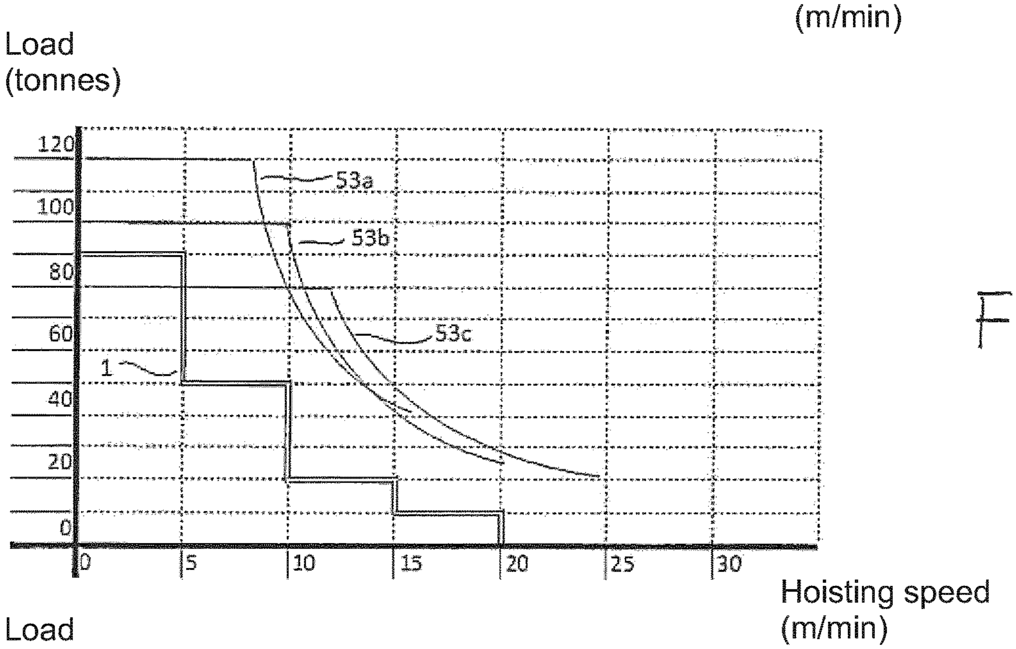

FIG. 4:

FIG. 4 illustrates a squirrel cage motor coupled to a fixed gearing having only one input shaft.

Graph 1=a graph of the required load-to-speed ratio.

For the calculation, the mechanism designer selects a squirrel cage motor with a rated power of 182 kW, the characteristics and information of which he/she receives from the motor designer.

FIG. 4 illustrates a typical calculation cycle in which the most optimal solution for the gear of the gearing and the motor is bracketed. The mechanism designer obtains the characteristics and information of the gearing from the gearing designer.

Graph 53*a*=a graph of the load-to-speed ratio generated by a squirrel cage motor coupled to the input shaft of a traditional fixed gearing.

In the graph 53*a*, the gear of the gearing is selected so that at a rated speed of 1200 rpm of the motor coupled to it, the speed of the hoisting means is 8 m/min.

According to graph 53*a*, a maximum speed of approximately 16 m/min is reached, which is well below the required 20 m/min.

Graph 53*c*=a graph of the load-to-speed ratio generated by a squirrel cage motor coupled to the input shaft of a traditional fixed gearing.

In the graph 53*c*, the gear of the gearing is selected so that at a rated speed of 1200 rpm of the motor coupled to it, the speed of the hoisting means is 12 m/min.

According to graph 53*c*, a maximum speed of approximately 25 m/min is reached, but at a speed of less than 5 m/min the requirement of the required load limit of 90 t is not reached.

Graph 53*b*=a graph of the load-to-speed ratio generated by a squirrel cage motor coupled to the input shaft of a traditional fixed gearing.

In the graph 53*b*, the gear of the gearing is selected so that at a rated speed of 1200 rpm of the motor coupled to it, the speed of the hoisting means is 10 m/min. With this selected gear and the selected motor characteristics, the required performance values are achieved and exceeded.

If a suitable gear for the gearing had not been found, the same calculations for the gear of the gearing would have been performed on another motor, having different ratings in terms of rated power or speed.

Figure 5:
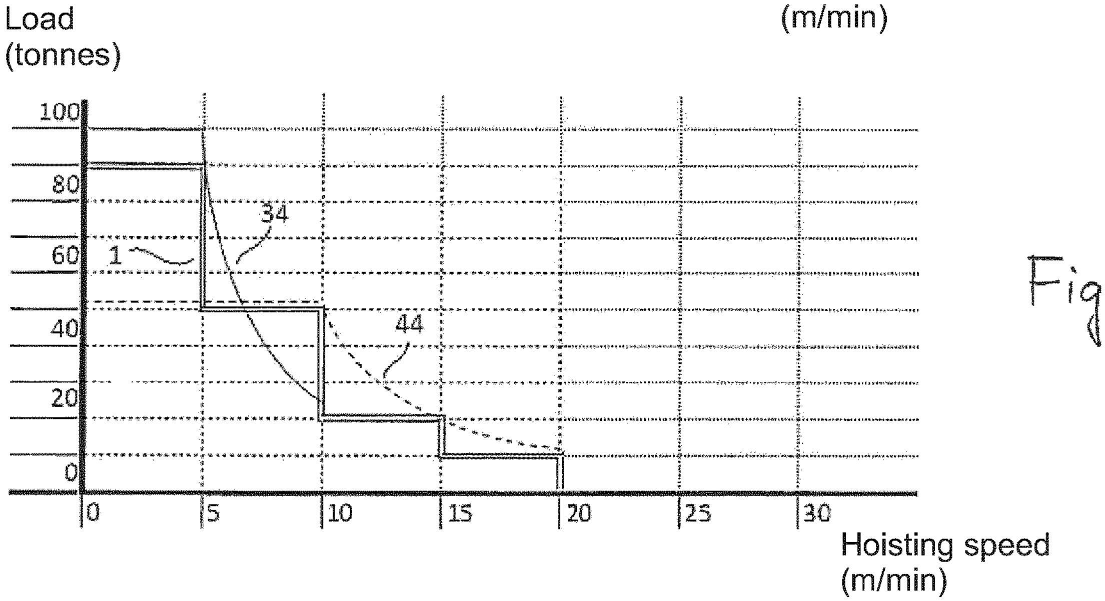

FIG. 5:

FIG. 5 illustrates the graphs of the required load-to-speed ratio of a two-step speed changing gearing.

Graph 1=a graph of the required load-to-speed ratio.

Graph 34=a graph of the load-to-speed ratio generated by the motor coupled to the input shaft of the speed changing gearing when the greater gear ratio, i.e. lower speed range, is coupled.

Graph 44=a graph of the load-to-speed ratio generated by the motor connected to the input shaft of the speed changing gearing when the lower gear ratio, i.e. greater speed range, is coupled.

The gear of the greater gear step, i.e. lower speed range, of the speed changing gearing, is selected so that at a rated speed of 1200 rpm of the first motor coupled to it, the speed of the hoisting means is 5 m/min.

The gear of the lower gear ratio, i.e. greater speed range, of the speed changing gearing, is selected so that at a rated speed of 1200 rpm of the second motor coupled to it, the speed of the hoisting means is 10 m/min.

This solution, which illustrates the traditional technology of the speed changing gear, has only one input shaft.

FIG. 6:

FIG. 6 illustrates a squirrel cage motor, designed to be high-performance, coupled to a fixed gearing having only one input shaft.

Graph 1=a graph of the required load-to-speed ratio.

Graph 45=a graph of the load-to-speed ratio generated by a squirrel cage motor coupled to the input shaft of a traditional fixed gear gearing.

The gear of the gearing is selected so that at a rated speed of 1200 rpm of the motor coupled to it, the speed of the hoisting means is 10 m/min. In this case, the required rated power of the motor is 182 kW.

From the graph of the squirrel cage motor it is seen that the required speed and hoisting capacity are achieved.

A gearing with a fixed gear is the simplest option, but this oversizes components and as the required speed range or load further increases and the required power increases above a certain limit, a different technical implementation has to be made, where the gears of the gearing are staggered.

FIG. 7:

FIG. 7 illustrates a squirrel cage motor coupled to the first and the second input shafts of the differential having the same total gear ratio relative to the output shaft.

Graph 1=a graph of the required load-to-speed ratio.

Graph 26=a graph of the load-to-speed ratio generated by 91 kW squirrel cage motors, having rated speeds of 1200 rpm, coupled to the first and the second input shafts of the differential. The gear of both differential stages is the same, so that by only using the motor of the other input shaft, a 5 m/min speed of the hoisting means is achieved at a rated speed of 1200 rpm of the motor. When both input shafts are used simultaneously, twice the speed is reached according to graph 36.

The differential is a less commonly used gearing, being more difficult to manufacture due to its complex structure and having higher costs. With two 91 kW motors and a differential, no performance gains in terms of speed or load capacity are achieved, as illustrated in the graph 45 in FIG. 6 and the graph 36 in FIG. 7.

The differential is used in special cases in cranes where a double hoisting mechanism is required to increase operational reliability. This corresponds to a situation where the other motor or its drive fails, allowing the same load to be further hoisted at half speed and the job to be completed.

FIG. 8:

FIG. 8 illustrates a squirrel cage motor coupled to the first and the second input shafts of the differential, in which the difference between the total gear ratios is double relative to the output shaft. The load is 15 t.

Graph 1=a graph of the required load-to-speed ratio.

Graph 27=a graph of the load-to-speed ratio generated by the first motor coupled to the first input shaft of the differential.

Graph 37=a graph of the load-to-speed ratio generated by the second motor coupled to the second input shaft of the differential.

The gear of the first input shaft of the differential is selected so that at a rated speed of 1200 rpm of the first motor coupled to it, the speed of the hoisting means is 5 m/min.

The gear of the second input shaft of the differential is selected so that at a rated speed of 1200 rpm of the second motor coupled to it, the speed of the hoisting means is 10 m/min.

The ratio between the total gear ratios of the first input shaft and the second input shaft is two. According to graph 37, the maximum hoisting speed is 30 m/min, corresponding to a load of 15 t, when the motors coupled to the first and the second input shafts are driven at twice the rated speed of rotation.

FIG. 9:

FIG. 9 illustrates a squirrel cage motor coupled to the first and the second input shaft of the differential, in which the ratio of the total gear ratios of the first and the second gears relative to the output shaft is 2. The load is 50 t.

Graph 28=a graph of the load-to-speed ratio generated by the first motor coupled to the first input shaft of the differential.

Graph 38=a graph of the load-to-speed ratio generated by the second motor coupled to the second input shaft of the differential. A 91 kW squirrel cage motor is used as the motors.

The gear of the first input shaft of the differential is selected so that at a rated speed of 1200 rpm of the first motor coupled to it, the speed of the hoisting means is 5 m/min.

The gear of the second input shaft of the differential is selected so that at a rated speed of 1200 rpm of the second motor coupled to it, the speed of the hoisting means is 10 m/min.

The ratio of the total gear ratios of the first and the second input shafts of the differential is 2.

The second motor coupled to the differential starts when the speed of the first motor of the first input shaft of the differential is approximately 7 m/min and the maximum load that can be hoisted is 50 t. When the second motor is accelerated to a rated speed of 1200 rpm, a speed of 17 m/min is achieved for the hoisting means with a load of 50 t. And further, with a lower load of 15 t, a hoisting speed of over 25 m/min can be achieved.

FIG. 10:

FIG. 10 illustrates a squirrel cage motor coupled to the first and the second gear of the differential, in which the ratio of the total gear ratios of the first and the second gears is 3.

Graph 1=a graph of the required load-to-speed ratio.

Graph 29=a graph of the load-to-speed ratio generated by the first motor coupled to the first input shaft of the differential.

Graph 39=a graph of the load-to-speed ratio generated by the second motor coupled to the second input shaft of the differential. A 91 kW squirrel cage motor is used as the motors.

The gear of the first input shaft of the differential is selected so that at a rated speed of 1200 rpm of the first motor coupled to it, the speed of the hoisting means is 5 m/min.

The gear of the second input shaft of the differential is selected so that at a rated speed of 1200 rpm of the second motor coupled to it, the speed of the hoisting means is 15 m/min.

The ratio of the total gear ratios of the first and the second input shafts of the differential is 3.

The second motor coupled to the differential starts when the speed of the first motor of the first input shaft of the differential is approximately 7 m/min and the maximum load that can be hoisted is 32 t. When the second motor is accelerated to rated speed 1200 rpm, a speed of 23 m/min is achieved for the hoisting means with a load of 32 t. And further, with a lower load of 15 t, a hoisting speed of 30 m/min can be achieved.

With the aid of FIGS. 8, 9, and 10, the advantage of the invention can be clearly demonstrated when a light load, an empty hook or a hoist member can be hoisted at speeds of over 25 m/min, while the powers of the motors can be designed clearly smaller. By comparing FIGS. 3-7 and 8-10, it is thus possible to spread the set of curves "to the right". This has been accomplished without the need to raise the set of curves "up" from the left edge, i.e. it has been possible to avoid oversizing the hoist motors and their power supply components.

The greater hoisting or lowering speed of a light load or an empty load member described in this application enables faster load handling in for example ports. Faster loading and unloading times of sea freight enable shorter times that the ships are on land, causing the ships to have the possibility to be more at seas, thus improving the efficiency and economics of the transport. The hoisting speeds matter particularly in ports having typically high hoist heights. The solution can be utilized also in construction cranes, mobile cranes and in hoists of windmill power plants. These are characterized by a constant force of gravity acting on the hoisting mechanism when it is desired to change the speed range in order to change the hoisting speed.

Coupling of the hoist motors to rotate or stop based on the load information can be done manually or automatically. To enable the automatic functioning, a comparison can be done between the load information and the load limit information.

The above description of the invention is only meant for illustrating the basic idea according to the invention. Therefore, the details of it may be implemented within the scope of the attached claims.

The invention claimed is:

1. A hoisting mechanism of a crane comprising:

at least one rope drum for a hoist rope;

at least one hoist motor for driving the rope drum, the at least one hoist motor including a first hoist motor and a second hoist motor;

a gearing coupled between the at least one rope drum and the at least one hoist motor, the gearing comprising input gears on a hoist motor side, including a first input gear and a second input gear, and an output gear on a rope drum side, wherein the gearing has a differential to which the first input gear and the second input gear are arranged, wherein the first input gear and the second input gear are coupled to each other and further coupled to the output gear, the first hoist motor is connected to the first input gear, and the second hoist motor is connected to the second input gear, wherein the differential includes a first input shaft and a second input shaft, and the first hoist motor and the second hoist motor are respectively coupled to the first input shaft and the second input shaft, and wherein the first input gear and the second input gear have unequal total gear ratios relative to an output shaft, and the hoisting mechanism has means to determine hoisted load information, and the hoisting mechanism is arranged to determine, by using the load information, that at higher values of a load limit value, only the hoist motor coupled to the input shaft having a higher input gear is used, and at lower values of the load limit value, hoist motors coupled to the first input shaft and the second in-put shaft are simultaneously used.

2. The hoisting mechanism according to claim 1, wherein the first and the second input gears are timewise uninterruptedly coupled via gear tooth contact to the output gear.

3. The hoisting mechanism according to claim 1, wherein the first input gear has a greater total gear ratio than the second input gear.

4. The hoisting mechanism according to claim 1, wherein the ratio between the total gear ratios of the first and second input gears is in the magnitude of approximately 1.1-2.5.

5. The hoisting mechanism according to claim 1, wherein the first input gear has a lower total gear ratio than the second input gear.

6. The hoisting mechanism according to claim 1, wherein the first input gear and the second input gear of the differential are unequal in diameter relative to the output shaft.

7. The hoisting mechanism according to claim 1, wherein the hoist motors are directly coupled to the gearing.

8. The hoisting mechanism according to claim 1, wherein the at least one hoist motor is a squirrel cage motor.

9. The hoisting mechanism according to claim 8, wherein at least one hoist motor is a frequency converter-controlled electric motor.

10. The hoisting mechanism according to claim 8, wherein at least one hoist motor is equipped with a sensor measuring the speed of rotation of its rotor.

11. The hoisting mechanism according to claim 8, wherein at least one brake is equipped with a sensor monitoring the open-closed state of the brake.

12. A method for operating a hoisting mechanism of a crane, the hoisting mechanism comprising:

at least one rope drum for a hoist rope;

at least one hoist motor for driving the rope drum, the at least one hoist motor including a first hoist motor and a second hoist motor;

a gearing coupled between the at least one rope drum and the at least one hoist motor, the gearing comprising input gears on a hoist motor side, including a first input gear and a second input gear, and an output gear on a rope drum side, wherein the gearing has a differential to which the first input gear and the second input gear are arranged, wherein the first input gear and the second input gear are coupled to each other and further coupled to the output gear, the first hoist motor is connected to the first input gear, and the second hoist motor is connected to the second input gear, wherein the differential includes a first input shaft and a second input shaft, and the first hoist motor and the second hoist motor are respectively coupled to the first input shaft and the second input shaft, and wherein the first input gear and the second input gear have unequal total gear ratios relative to an output shaft, and the hoisting mechanism has means to determine hoisted load information, the method comprising:

determining a load limit value by using the load information, wherein at higher values of the load limit value, only one of the first hoist motor and the second hoist motor that is coupled to a respective input shaft having a lower achievable hoisting speed is used, and at lower values of the load limit value, the first and second hoist motors that are respectively coupled to the first input shaft and the second input shaft are simultaneously used.

13. The method according to claim 12, wherein the maximum speed of rotation for the hoist motors running simultaneously or separately, connected to the input shafts of the differential of the same hoisting mechanism, is determined on the basis of load information.

14. The method according to claim 12, wherein hoisting speeds are limited in order to limit the total power absorbed by the hoisting mechanisms.

15. The method according to claim 12, wherein frequency converter-controlled squirrel cage motors are selected as the hoist motors.

* * * * *